Figure 1:
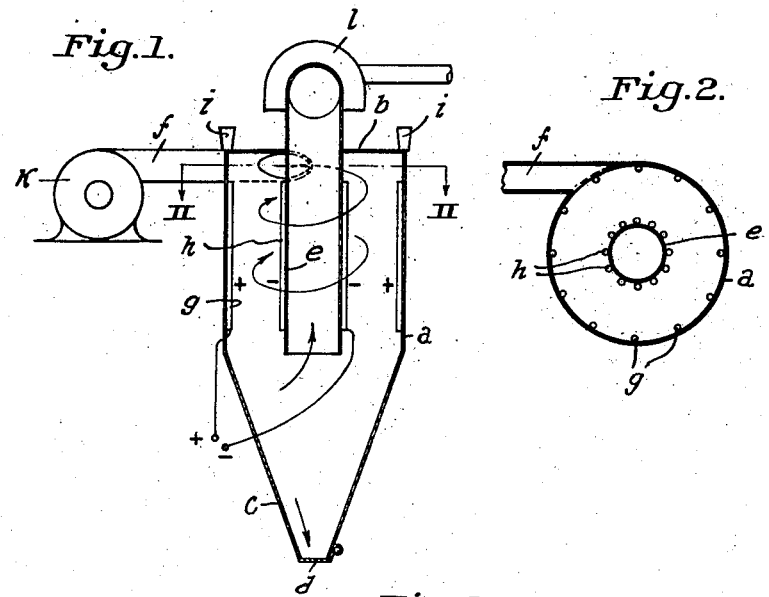

May 25, 1937.　　E. C. SAINT-JACQUES　　2,081,772

METHOD AND DEVICE FOR THE ELECTRICAL PURIFICATION OF GASES

Filed Feb. 1, 1937

INVENTOR
Eugene Camille Saint-Jacques
by his attorneys
Stebbins, Blenko & Parmelee Patented May 25, 1937

2,081,772

UNITED STATES PATENT OFFICE 2,081,772

METHOD AND DEVICE FOR THE ELECTRICAL PURIFICATION OF GASES

Eugène Camille Saint-Jacques, Paris, France

Application February 1, 1937, Serial No. 123,316
In France January 7, 1936

5 Claims. (Cl. 183—7)

This invention relates to a method and device for the electrical purification of gases.

There has already been proposed to use the electric polarization actions to remove dusts from a gas in which they are in suspension. In the devices presently used for carrying out said method, the gas to be purified is passed through two series of tubes, the ones containing a conductor charged with negative electricity and the others a conductor charged with positive electricity. The dusts carried along with the gaseous current are thus fixed on the tubes enclosing the conductors charged with positive electricity, under the combined action of the attraction caused by said positive charge and of the repulsion due to the negative electricity, which charges the conductors of the second series of tubes. The electrical power necessary to attain such a result shall be high enough to astrain by itself the dusts to deviate from the direction imparted to them by the gaseous current in which they are carried along, which can be obtained only by using high tension currents of the order of f. i. 50,000 volts and by giving a very low speed of the order of 3 metres per second to the gaseous current in which the dusts are suspended. This double condition is the reason for the high cost of plants of this kind and also for the large space which they require, owing to the low circulation speed of the gas to be purified.

According to my present invention I suggest to do away or to considerably reduce the above mentioned drawbacks by combining the actions of the gaseous current with the actions of the electricity instead of opposing them as in the present devices.

My invention consists in a method for electrically removing from a gas impurities in suspension therein, comprising the steps of imparting a downwardly helical movement in a helix of constant section to the soiled gas under pressure, submitting this gas to the opposed actions of negative and positive electricity and preventing any irregularity of the helical movement. According to a further feature of my invention I use an upwardly directed suction along the axis of the helical movement. The result of such a proceeding is that the centrifugal force which is developed by the circumferential gaseous current is added to the electric attraction and repulsion effects for applying the dusts against the outer electrodes.

Under such conditions it is easily conceived that there will be no reason for limiting the speed of the gaseous current and that it is possible to adopt for this speed usual values of the order of 15 to 20 metres per second, which can result in a reduction of the required place of more than 80% and, therefore, a very appreciable diminution of the costs for the erection of the plant. It is also possible to reduce the tension of the necessary electric current in a very appreciable manner.

The method according to my invention can be easily carried into practice by means of a device of the cyclone type comprising two concentric cylindrical walls against which tubes having a positive electric charge and tubes having a negative electrical charge respectively are arranged, this device being provided with a tangential inlet through which the gas soiled with dusts is introduced with a suitable speed into the annular space between both walls. For instance the apparatus according to my present invention may comprise a fan for supplying the soiled gas under pressure, a cylindrical body closed at its upper end, a cone having its upper basis of the same section than and connected to the lower basis of the cylindrical body, an opening in the apex of said cone, a release valve closing said opening, a cylindrical tube open at both ends and coaxial with the cylindrical body, a pipe tangentially opening into the cylindrical body near upper end of the latter, a series of longitudinal electrodes arranged on the inner surface and parallel to the axis of the cylindrical body and charged with positive electricity, a second series of longitudinal electrodes arranged on the outer surface and parallel to the axis of the cylindrical tube and charged with negative electricity.

In the accompanying drawing:

Figure 1 is an axial sectional view of an apparatus for carrying out my invention.

Figure 2:
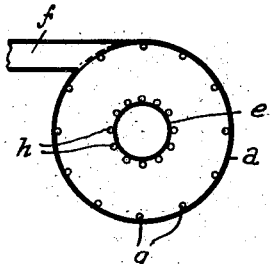

Figure 2 a horizontal sectional view through line 2—2 of Figure 1.

Figure 3:
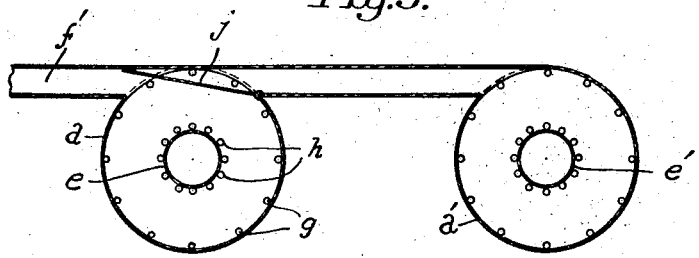

Figure 3 a similar horizontal sectional view of a group of two apparatuses connected in series.

Figure 4:
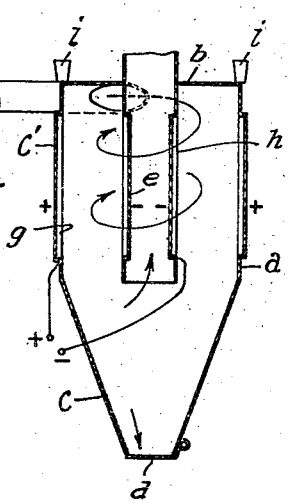
Figure 5:
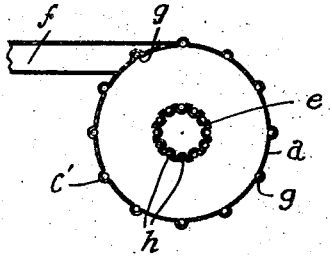

Figures 4 and 5 are views of modified forms of execution of the apparatus shown in Figures 1 and 2 respectively.

In the example shown in Figure 1, $a$ is the outer cylindrical body of the cyclone closed in its upper part by a cover $b$ and extended in its lower part by a cone $c$ provided in its apex with an aperture closed by a flap valve $d$. Arranged in the axis of the cylindrical body $a$ is a cylindrical partition $e$ open at both ends and forming an outlet flue. $f$ shows the suction pipe for the gaseous current tangentially connected with the cylindrical body $a$. Located on the inner wall of the cylindrical body are tubes $g$ containing, in a known manner, conductors charged with positive electricity, and on the outer wall of the cylindrical partion $e$ are tubes $h$ provided with conductors charged with negative electricity. Said tubes and conductors may be called electrodes.

As may be seen from the above description the gaseous current soiled with dusts and introduced into the apparatus through the tangential pipe $f$ by means of a fan $k$, for instance, takes a gyratory movement in the annular space between the walls $a$ and $e$. Under the combined action of the centrifugal force and of the electric attraction and repulsion effects produced by the currents flowing in the tubes $g$ and $h$, the dusts are thrown against the electropositive $g$ on which they remain fixed, while the gas freed from the dusts is drawn in by a fan $l$, f. i., and evacuated through the outlet flue $e$.

In order to prevent the tubes $g$ and $h$ forming projections detrimental for a good circulation of the gaseous current on the walls $a$ and $e$, said tubes may be inserted in grooves $c'$ provided in said walls (Figures 4 and 5).

The above designed apparatus may be provided with usual devices adapted intermittently to cause the falling off of the dusts retained on the tubes $g$, such as pneumatic hammers $i$ striking onto the upper part of the apparatus. The dusts fall into the cone $c$ and are evacuated through the opening in the apex of said cone after opening of the flap valve $d$; said opening may be controlled by means of a pneumatic device synchronously operating with the hammers $i$.

Two apparatuses as shown in Figure 1 may be advantageously connected as shown in Figure 3 by means of a common inlet duct $f'$ tangentially connected with each of their cylindrical bodies $a$, $a'$, a flap valve $j$ being provided in said duct in order to permit directing the gaseous current to be freed from dust alternatively into the one or the other of both apparatuses. Thus it is possible to change the apparatus each time it is necessary to remove the tubes of the previously operating apparatus.

What I claim is:

1. The method of purifying gas, comprising imparting a downward and helical movement to an annulus of gas containing particles of dust, subjecting substantially the entire length of the annulus of gas between the inner and outer peripheries thereof to an electrical discharge passing in one direction through the annulus of gas, to remove the dust to the outer periphery of the annulus, and then passing the purified gas upwardly through the center of the annulus.

2. An apparatus for purifying gas comprising, a cylindrical body closed at both ends, a release valve in the lower portion of the body, a cylindrical partition open at both ends and coaxial with the cylindrical body, a pipe opening tangentially into the cylindrical body near the upper end of the latter, there being an annular passage between the inner wall of the cylindrical body and the outer wall of the partition through which an annulus of gas is passed in a downward and helical direction, a series of longitudinal electrodes arranged on the inner surface of the cylindrical body and charged with positive electricity, a second series of longitudinal electrodes arranged on the outer surface of the partition and charged with negative electricity, whereby the electrical discharge is passed through the annulus of gas in one direction during its downward movement, and means for passing the purified gas upwardly between the walls of the cylindrical partition.

3. An apparatus for purifying gas comprising, a cylindrical body closed at both ends, a release valve in the lower portion of the body, a cylindrical partition open at both ends and coaxial with the cylindrical body, a pipe opening tangentially into the cylindrical body near the upper end of the latter, there being an annular passage between the inner wall of the cylindrical body and the outer wall of the partition through which an annulus of gas is passed in a downward and helical direction, a series of longitudinal electrodes arranged on the inner surface and parallel to the axis of the cylindrical body and charged with positive electricity, a second series of longitudinal electrodes arranged on the outer surface of the partition and parallel to the axis of the partition and charged with negative electricity, whereby the electrical discharge is passed through the annulus of gas in one direction during its downward movement, and means for passing the purified gas upwardly between the walls of the cylindrical partition.

4. An apparatus for purifying gas comprising, a cylindrical body closed at both ends, a release valve in the lower portion of the body, a cylindrical partition open at both ends and coaxial with the cylindrical body near the upper end of the latter, there being an annular passage between the inner wall of the cylindrical body and the outer wall of the partition through which an annulus of gas is passed in a downward and helical direction, a series of longitudinal grooves in the wall of the cylindrical body, an electrode in each of said grooves, means for feeding positive electricity to each of said electrodes, a series of longitudinal grooves in the outer wall of the cylindrical tube, an electrode in each of the grooves of said second series, means for feeding negative electricity to each of said electrodes, whereby the electrical discharge is passed through the annulus of gas in one direction during its downward movement, and means for passing the purified gas upwardly between the walls of the cylindrical partition.

5. An apparatus for carrying out the method according to claim 1, which comprises a fan for supplying the soiled gas under pressure, a cylindrical body closed at its upper end, a cone having its upper basis of the same section and connected to the lower basis of the cylindrical body, an opening in the apex of said cone, a release valve closing said opening, a cylindrical tube open at both ends and coaxial with the cylindrical body, a pipe tangentially opening into the cylindrical body near the upper end of the latter, a series of longitudinal electrodes arranged on the inner surface and parallel to the axis of the cylindrical body, means for feeding positive electricity to said series of electrodes, a second series of longitudinal electrodes arranged on the outer surface and parallel to the axis of the cylindrical tube, and means for feeding negative electricity to said second series of electrodes, an extension for the tangential pipe opening into the cylindrical body outside of said body, a shutter permitting the tangential pipe to communicate either with its extension or with the cylindrical body, a second cylindrical body closed at its upper end having a tangential opening near said upper end for the extension of the first tangential pipe, a second cone having its upper basis of the same section than and connected to the lower basis of this second cylindrical body, an opening in the apex of said second cone, a release valve closing said second opening, a cylindrical tube open at both ends and coaxial with the second cylindrical body, a series of electrodes longitudinally arranged on the inner surface and parallel to the axis of the second cylindrical body, means for feeding positive electricity to said series of electrodes, a second series of electrodes longitudinally arranged on the outer surface and parallel to the axis of the last cylindrical tube, and means for feeding negative electricity to said second series of electrodes.

EUGÈNE CAMILLE SAINT-JACQUES.